US012564927B2

(12) United States Patent
Baudrand et al.

(10) Patent No.: US 12,564,927 B2
(45) Date of Patent: *Mar. 3, 2026

(54) ELECTROPORTABLE DEVICE

(71) Applicant: Illinois Tool Works Inc., Glenview, IL (US)

(72) Inventors: Olivier Baudrand, Paris (FR); Pascale Grandjean, Guilherand-Granges (FR); Frederic Nayrac, Bourg-lès-Valence (FR); Christian Ricordi, Bourg-lès-Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/683,419

(22) PCT Filed: Sep. 7, 2022

(86) PCT No.: PCT/US2022/042687

§ 371 (c)(1),
(2) Date: Feb. 13, 2024

(87) PCT Pub. No.: WO2023/038922

PCT Pub. Date: Mar. 16, 2023

(65) Prior Publication Data

US 2024/0383116 A1 Nov. 21, 2024

(30) Foreign Application Priority Data

Sep. 8, 2021 (FR) ...................................... 2109410

(51) Int. Cl.
*B25C 1/06* (2006.01)

(52) U.S. Cl.
CPC ..................................... *B25C 1/06* (2013.01)

(58) Field of Classification Search
CPC .. B25C 1/06; B25C 1/008; B25C 1/00; B25C 1/047; B25C 1/08; H02K 33/00;
(Continued)

(56) References Cited

U.S. PATENT DOCUMENTS

2014/0374461 A1* 12/2014 Pedicini .................... B25C 1/06 227/140
2021/0387317 A1* 12/2021 Dittrich ..................... B25C 1/08

FOREIGN PATENT DOCUMENTS

EP 3670098 A1 6/2020
EP 3838492 A1 6/2021

OTHER PUBLICATIONS

International Search Report and Written Opinion from International Application No. PCT/US2022/042687, mailed Dec. 14, 2022 (9 pages).

* cited by examiner

*Primary Examiner* — Veronica Martin
(74) *Attorney, Agent, or Firm* — Neal, Gerber & Eisenberg LLP

(57) ABSTRACT

A portable electric device comprising a cylinder in which at least one movable piston slides between a start position and an end position, said piston comprising a mechanism configured to come into contact with an element to be operated once the piston is in the end position or is between the start position and the end position. More specifically, the portable electric device comprises: a power supply intended to supply power to a first fixed coil, the first fixed coil being positioned facing an expulsion mechanism for expelling the piston when the piston is in the start position, the expulsion mechanism being secured to a first face of the movable piston; and at least one braking mechanism for braking the (Continued)

piston that are configured to brake the piston when the piston is in the end position or approaching the end position.

9 Claims, 2 Drawing Sheets

(58) Field of Classification Search
CPC .. H02K 11/0094; H02K 33/12; H02K 17/168; H02K 2213/03; H02K 33/02; H02K 41/025; H02K 41/0352; H02K 41/0354; H02K 7/145
See application file for complete search history.

ELECTROPORTABLE DEVICE

PRIORITY CLAIM

This application is a national stage application of PCT/US2022/042687, filed on Sep. 7, 2022, which claims priority to and the benefit of French Application No. 2109410, filed Sep. 8, 2021, the entire contents of which are incorporated herein by reference.

TECHNICAL FIELD

The present disclosure relates to a battery-powered electroportable or portable electric device. More specifically, the present disclosure relates to a portable electric device of the nail fastener driving tool type that makes it possible to drive nails into a support.

BACKGROUND

Well-known portable electric tools use an electric motor driving a flywheel or a geared motor compressing a spring in order to store mechanical energy that makes it possible to set movable parts of the portable electric device in movement, such as for example a piston fitted with a firing pin in the case of a nail fastener driving tool.

The drawbacks of this type of solution are numerous, in particular a reduced service life, weak output and high weight.

It would therefore be advantageous to provide the operator with a portable electric tool which alleviates the problems cited.

SUMMARY

The present disclosure relates to a portable electric device comprising a cylinder in which at least one movable piston slides between a start position and an end position, said piston comprising a mechanism configured to come into contact with an element to be operated once the piston is in the end position or is between the start position and the end position. More specifically, the portable electric device comprises: (a) a power supply intended to supply power to a first fixed coil, the first fixed coil being positioned facing an expulsion mechanism for expelling the piston when the piston is in the start position, the expulsion mechanism being secured to a first face of the movable piston; and (b) at least one braking mechanism for braking the piston that is/are configured to brake the piston when the piston is in the end position or approaching the end position.

According to an advantageous embodiment of the present disclosure, the material of the movable piston is an isotropic, soft magnetic composite material with high resistivity.

Additionally, the material of the movable piston can be Somaloy.

Moreover, the expulsion mechanism can be a conductive metallic ring or a coil.

Advantageously, said at least one braking mechanism can be a flexible material positioned in the bottom of the cylinder or positioned entirely or partially on the piston.

Moreover, said at least one braking mechanism can comprise a first braking mechanism positioned on one face of the piston and facing a second braking mechanism positioned in the bottom of the cylinder.

Advantageously, the first braking mechanism can be a coil or a metallic ring and the second braking mechanism can be a coil.

According to one embodiment, the piston comprises a first movable piston P1 and a second movable piston P2 which are separate, said first face being located on the first piston P1 and said second face being located on the second piston P2, the first piston being configured to push the second piston when the first piston is ejected by said expulsion mechanism.

Advantageously, the first and second pistons can be in contact.

Additionally, the first piston can be made of an isotropic, soft magnetic composite material with high resistivity.

Additionally, the first piston P1 can be of Somaloy type.

BRIEF DESCRIPTION OF THE SEVERAL VIEWS OF THE DRAWINGS

Embodiments of the present disclosure will now be described solely by way of example with reference to the drawings of FIGS. 1 to 4.

DETAILED DESCRIPTION

Figure 1:
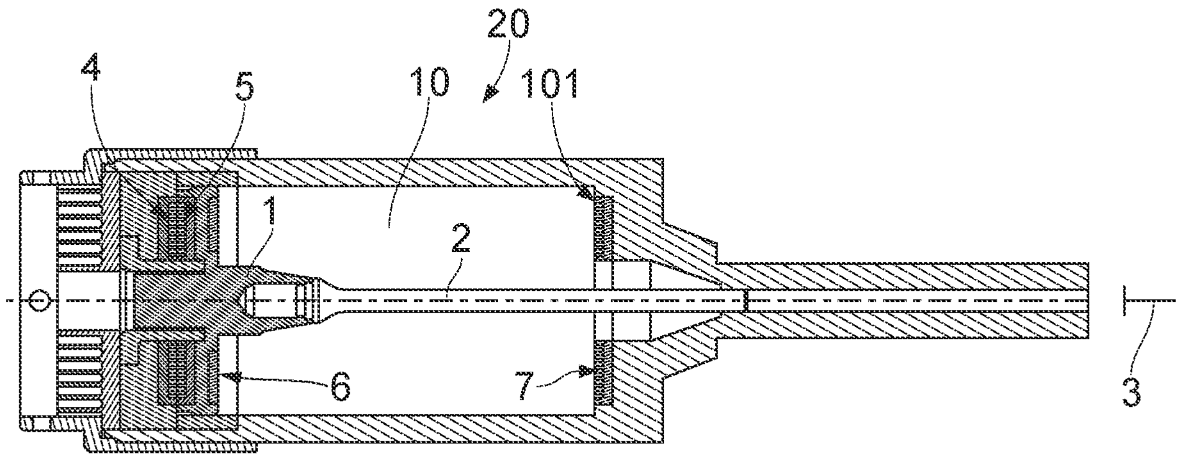
FIG. 1 illustrates a first embodiment of the present disclosure, the piston being in the start position.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

To avoid any doubt, all the features described here likewise apply to any aspect of the present disclosure.

In the context of the present application, it is expressly provided that the various aspects, embodiments, examples and alternatives mentioned in the above paragraphs, in the claims and/or in the description and the following drawings, and in particular the individual features thereof, may be taken independently or in any combination. In other words, all of the embodiments and/or the features of any embodiment may be combined in any way, unless these features are incompatible.

To avoid any ambiguity, the terms “can”, “may”, “and/or”, “for example”, and any other similar terms used in the present document should be interpreted as being nonlimiting, such that any feature described in this way does not necessarily have to be present. Specifically, any combination of optional features is expressly envisaged without departing from the scope of the present disclosure, whether they are expressly mentioned or not. The applicant reserves the right to modify any originally filed claim or to consequently file any new claim, including the right to modify any originally filed claim such that it depends on and/or incorporates any feature of any other claim, even if it was not originally claimed in this way.

Now the present disclosure is further described with reference to FIGS. 1 to 4.

A person skilled in the art will appreciate that numerous variants of the embodiments described are conceivable without departing from the scope of the present disclosure.

FIG. 1 illustrates a first embodiment of a portable electric device 20, such as, for example but not exclusively, a nail fastener driving tool, comprising a cylinder 10 in which at least one movable piston 1 slides between a start position and an end position, said piston comprising a mechanism 2 configured to come into contact with an element 3 (in this instance, a nail) to be operated once the piston is in the end position or is between the start position and the end position.

The start position of FIG. 1 corresponds to a position before the nailing phase is triggered.

Figure 2:
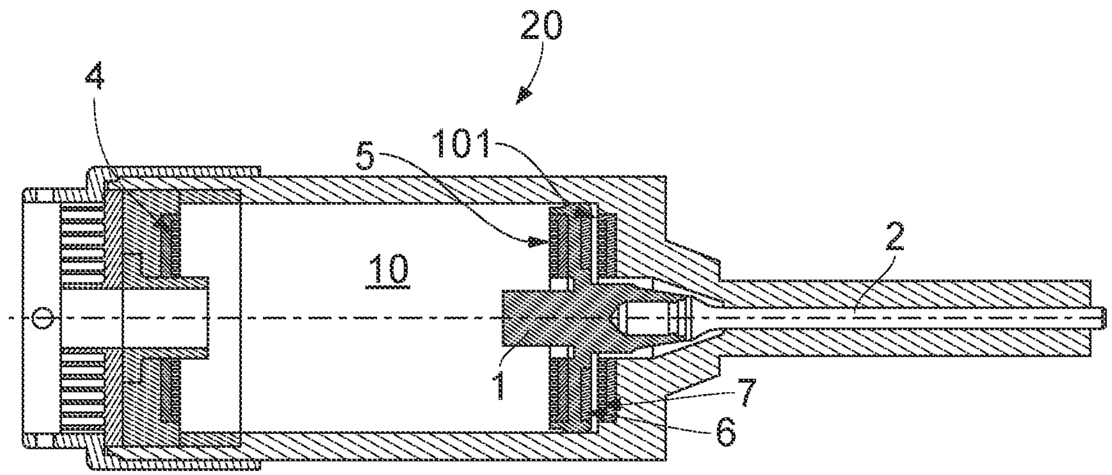
FIG. 2 illustrates the first embodiment with the piston in the end position.

In this first embodiment, the end position of FIG. 2 corresponds to a position of the piston at the end of travel, specifically when it abuts a wall 101 of the cylinder 10.

More specifically, the portable electric device comprises: (1) a power supply intended to supply power to a first fixed coil 4, the first fixed coil being positioned facing an expulsion mechanism 5 for expelling the piston when the piston is in the start position, the expulsion mechanism being secured to a first face of the movable piston; and (2) at least one braking mechanism 6 and/or 7 for braking the piston that are configured to brake the piston when the piston is in the end position or approaching the end position.

The power supply can be of the wired or battery-powered type.

Thus, once it has been supplied with power, the fixed coil 4 positioned facing the expulsion mechanism 5 makes it possible to expel the piston in accordance with a well-known effect, the Thomson effect, which describes the relationship between an electric current (or an electric voltage) and a heat flux (or a temperature gradient) within a conductive material.

In the end position illustrated in FIG. 2, the braking mechanism 6 is located facing a braking mechanism 7 made on the wall 101 of the cylinder 10. The piston is thus braked.

According to the present disclosure, the material of the movable piston is an isotropic, soft magnetic composite material with high resistivity, for example but not exclusively of Somaloy type.

Additionally, the expulsion mechanism 5 is a conductive metallic ring or a coil. Advantageously, the expulsion mechanism 5 is secured to a first face of the movable piston, said first face being located facing the first fixed coil 4. Thus, the piston is expelled symmetrically and uniformly along a longitudinal axis of the cylinder 10.

In this embodiment, the braking mechanism is made of a flexible material, such as for example an elastomer, a polyurethane, or any other material commonly used and suitable for the production of dampers used for example in gas nail fastener driving tools or pneumatic nail fastener driving tools. This braking mechanism is positioned in the bottom of the cylinder (not shown) or positioned entirely or partially on the piston (as shown in FIG. 1).

In one variant (not shown), the braking mechanism comprises a first braking mechanism 6 positioned on one face of the piston and facing a second braking mechanism 7 made on the wall 101 located in the bottom of the cylinder 10.

In one variant, the first and second braking mechanism are made from a flexible material with damping properties. In this case, the braking of the piston is mechanical braking.

In one variant, the first braking mechanism is a coil or a metallic ring and the second braking mechanism is a coil. In this case, the braking of the piston is magnetic braking.

Optionally, the first and second braking mechanisms can be a combination of the variants above, specifically combining mechanical braking (flexible material) and magnetic braking (coil or metallic ring). Such a variant gives free rein to all possible configurations depending on the design constraints of the piston/cylinder assembly.

Figure 3:
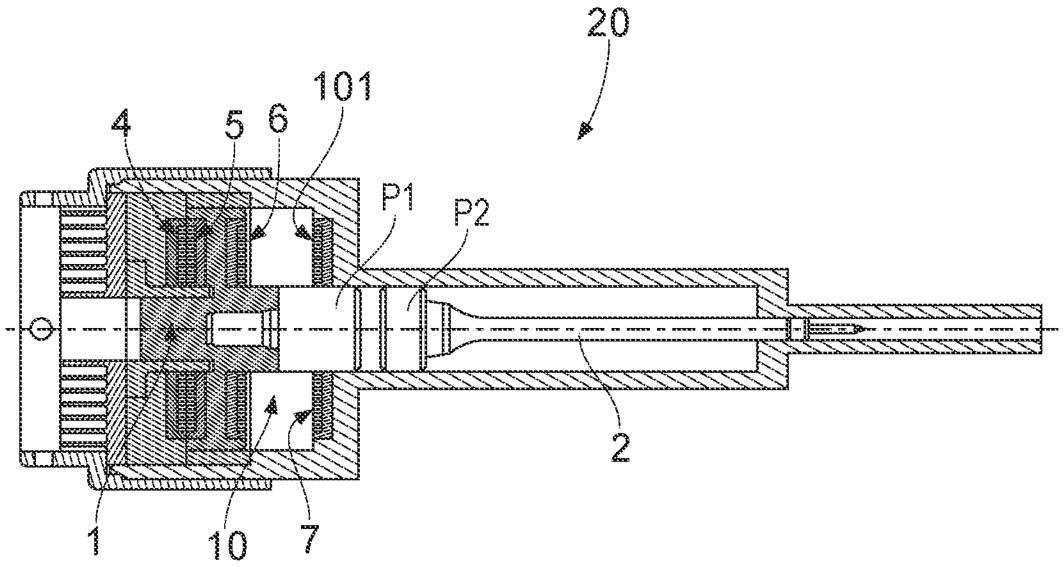
FIG. 3 illustrates a second embodiment of the present disclosure, the piston being in the start position.
Figure 4:
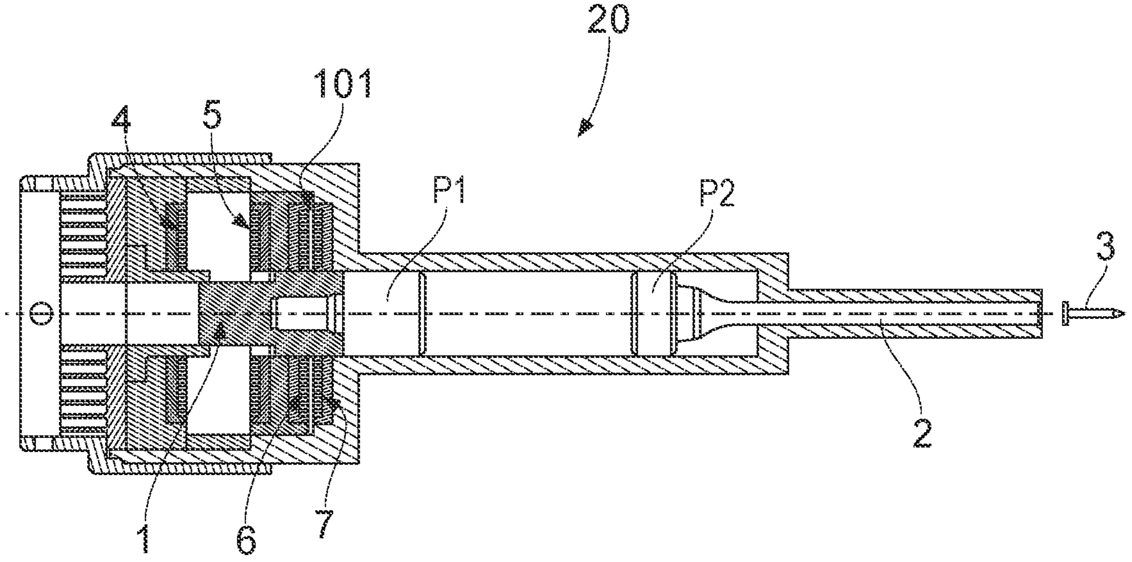
FIG. 4 illustrates the second embodiment with the piston in the end position.

According to a second embodiment of the present disclosure shown in FIGS. 3 and 4, the piston 1 comprises a first movable piston P1 and a second movable piston P2 which are separate, the first face being located on the first piston P1 and the second face being located on the second piston P2, the first piston being configured to push the second piston when the first piston is ejected by said expulsion mechanism.

Advantageously, the first and second pistons are initially in contact, the first piston P1 pushing the second piston P2 between the start position of the piston 1 (FIG. 3) and the end position of the piston 1 (FIG. 4). Such a configuration makes it possible to limit shocks by avoiding the tile phenomenon, and thus makes it possible to configure a more compact, and therefore more lightweight, device by reducing the size of the cylinder 10.

In a variant, the materials of the first and second pistons P1 and P2 are identical or different.

Additionally, the first piston is made of an isotropic, soft magnetic composite material with high resistivity.

Additionally, the first piston P1 is of Somaloy type.

In these two embodiments, the use of two coils head-to-tail (one on the piston and the other in the bottom of the cylinder) makes it possible to electromagnetically return the piston. Thus, the rearming of the piston is made easier, in addition to enabling a more compact configuration via the use of a shorter cylinder length.

The invention claimed is:

1. A portable electric device comprising:
- a cylinder;
- a piston movable in the cylinder from a start position to an end position and back to the start position, the piston including a mechanism configured to contact an element to be operated as the piston moves from the start position to the end position;
- an expulsion mechanism secured to a first face of the piston;
- a first fixed coil positioned facing the expulsion mechanism;
- a power supply configured to supply power to the first fixed coil to cause the first fixed coil to cause the expulsion mechanism to expel the piston when the power supply supplies power to the first fixed coil; and
- a first braking mechanism positioned on a face of the piston and a second braking mechanism positioned in a bottom of the cylinder configured to interact to brake the piston when the piston approaches the end position,
  - wherein the first braking mechanism includes a conductive metallic ring or a first coil and the second braking mechanism includes a second coil, and
  - wherein the power supply is configured to supply power to the second coil of the second braking mechanism to cause the second coil to expel the first braking mechanism to brake the piston when the power supply supplies power to the second coil.

2. The portable electric device of claim 1, wherein the piston includes an isotropic, soft magnetic composite material with high resistivity.

3. The portable electric device of claim 2, wherein the piston includes Somaloy.

4. The portable electric device of claim 1, wherein the expulsion mechanism includes a conductive metallic ring or a coil.

5. The portable electric device of claim 1, wherein the first braking mechanism includes the first coil.

6. The portable electric device of claim 1, wherein the first braking mechanism includes the conductive metallic ring.

7. The portable electric device of claim 1, wherein the piston includes a first movable piston and a second movable piston that are separate, wherein a first face is located on the first moveable piston and a second face is located on the second moveable piston, wherein the first moveable piston is configured to push the second moveable piston when the first moveable piston is ejected by the expulsion mechanism.

8. The portable electric device of claim 7, wherein the first moveable piston and the second moveable piston are in contact.

9. The portable electric device of claim 7, wherein the first moveable piston includes an isotropic, soft magnetic composite material with high resistivity.

* * * * *